Nov. 16, 1971   R. R. HOCQ   3,620,015
GAS-FUELLED DEVICES
Filed July 8, 1969   7 Sheets-Sheet 1
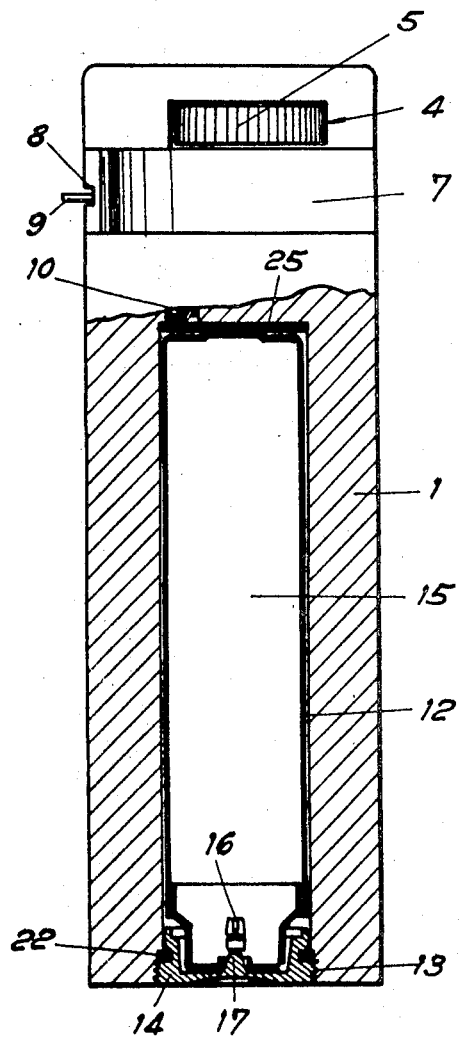
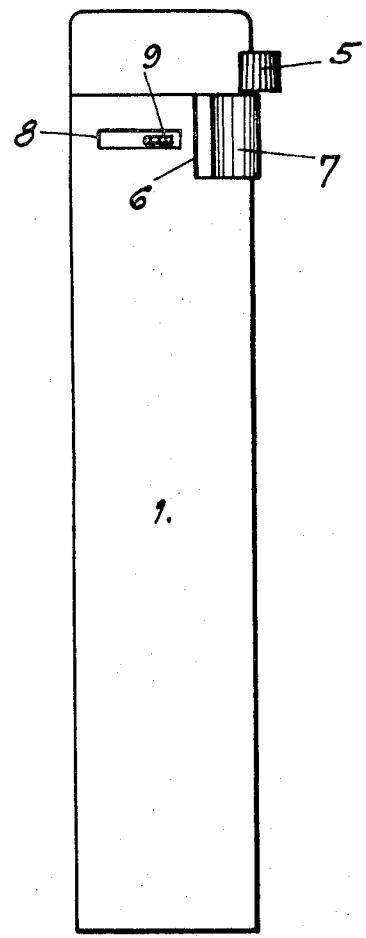
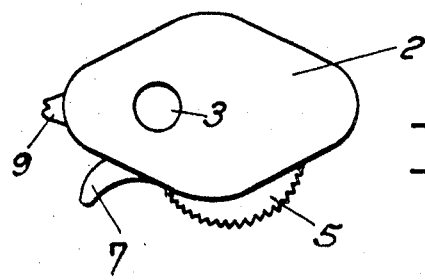
INVENTOR:
ROBERT RAYMOND HOCQ
BY
Curtis, Morris & Safford
ATTORNEYS.

United States Patent Office 3,620,015
Patented Nov. 16, 1971

3,620,015
GAS-FUELLED DEVICES
Robert R. Hocq, Boulogne-Billancourt, France, assignor to Société Franco-Hispano-Americaine Francispam, Paris, France
Filed July 8, 1969, Ser. No. 839,835
Claims priority, application France, July 10, 1968, 158,626
Int. Cl. F17c 7/02
U.S. Cl. 60—52
9 Claims

ABSTRACT OF THE DISCLOSURE

A gas fuelled device, for example a cigarette lighter, which has a casing carrying an expansion valve and which is arranged to have a cartridge containing liquid gas inserted in it. The casing is provided with a chamber which is arranged so that gas from the cartridge flows into it prior to reaching the expansion valve. The casing is also provided with a detachable base which, in the assembled position, is arranged to seal the chamber and to cause gas in the cartridge to flow automatically into the chamber.

---

Figure 4:
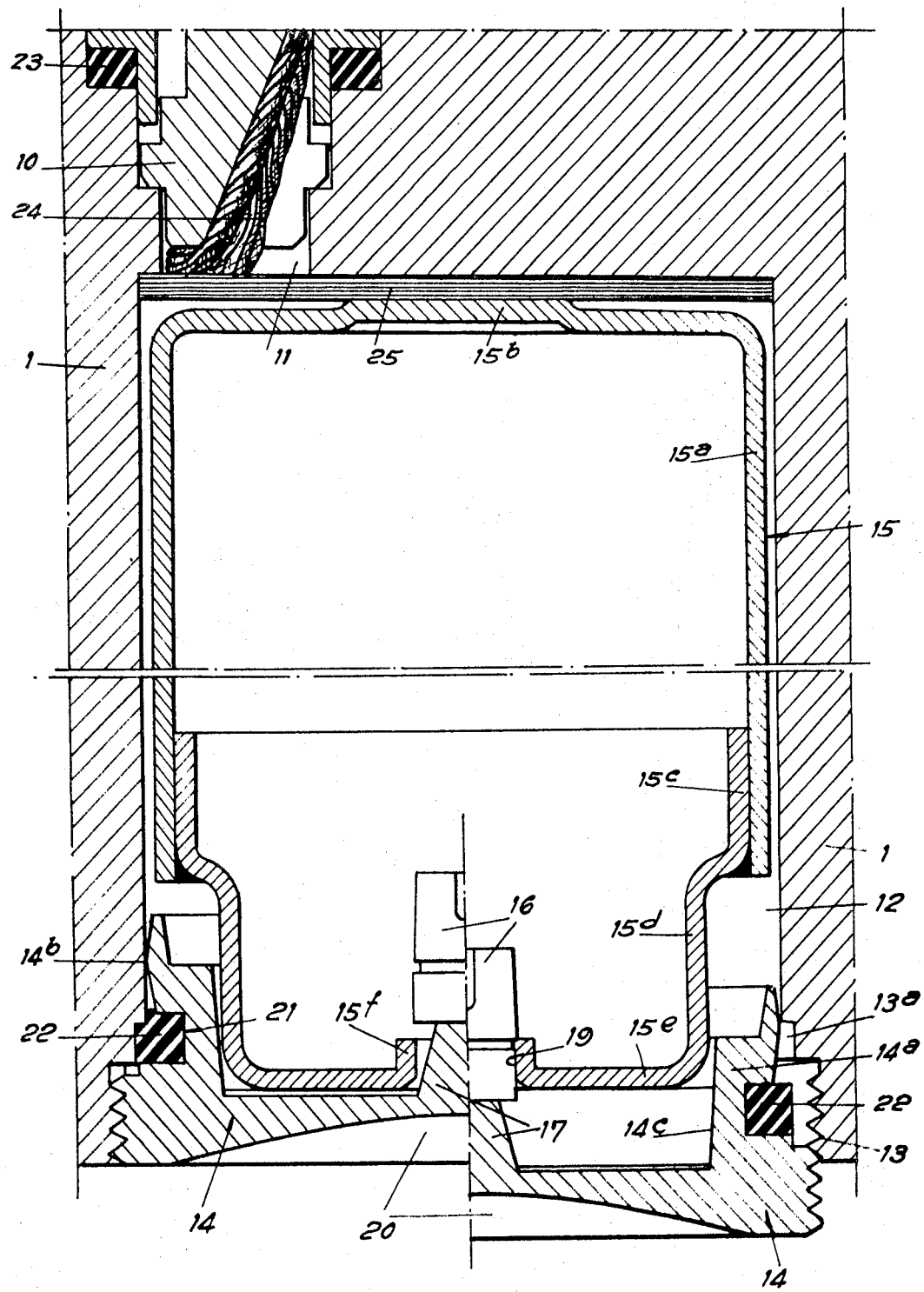

This invention relates to gas fuelled devices, such as, gas fuelled lighters, aerosol bombs, gas fuelled lamps or gas fuelled portable stoves, in which the gas is supplied from a cartridge containing liquid gas.

The invention is more particularly, but not exclusively, concerned with gas fuelled lighters, and these can be divided into two general categories particularly as far as cigarette lighters are concerned.

In the first category, the lighter comprises a case carrying a lighter mechanism, into which case a gas cartridge is introduced equipped with an expansion valve which, at the instant that the cartridge is fitted in position in the case, comes into engagement with the lighter mechanism.

In the second category, this covering the first gas lighters which were designed in accordance with the petrol lighter principle, the case acts as a reservoir and contains on the one hand an expansion valve in engagement with the lighter mechanism, and on the other hand a filler valve through which are introduced the contents of a cartridge (of simple design or the "multi-fill" type containing several charges) equipped with a cap or sealing device which is pierced or opened by an element integral with the filler valve of the apparatus at the time when the cartridge is applied to said valve.

Also, lighters or aerosol bombs have long been known which combine certain features of the two foregoing categories, in the sense that their case carries an expansion valve (possibly associated with an ignition mechanism) and a filler valve equipped with a device which opens an exit orifice provided in a detachable cartridge when the latter is fully inserted into the case.

For example, in U.S. patent specification No. 1,920,165, a toothpaste atomiser is described in which a cartridge of carbon dioxide gas is perforated when assembled in position in the case of the apparatus, and part of the gas discharges the toothpaste when a valve is opened, whilst another part of the gas enters a certain passage and leaving atomises the toothpaste.

In U.S. patent specification No. 2,539,653, a petrol lighter has been described, the case of which contains two compartments: One of the compartments is filled with wadding and contains the conventional wick, whilst the other accommodates a petrol cartridge which is pierced at the time of assembly by a spigot fixed in the base of the lighter, the said spigot being hollow and its wall containing a hole through which the petrol can wet a second wick through which the spigot passes and which terminates in the wadding contained in the main compartment.

In this case, the cartridge is introduced through the top end of the lighter and a spring urges it into contact with the base thereof.

In U.S. patent specification No. 2,810,282, a lighter is described with an external ornamental cover and a main casing located within the cover, the major part of the casing forming a reservoir and receiving a gas cartridge, whilst the top wall, of substantial thickness, carried the lighter operating mechanism (valve, valve lever, flint-wheel and flint tube). A needle carried by the top wall perforates the cartridge when it is fitted in position, although this needle is not carried by the valve, and two toroidal seals are provided one surrounding the cartridge and the other lodged in an annular groove in the wall, in order to enable the gas leaving the cartridge to pass the valve through the narrow space defined between the cartridge and the wall of the main casing.

All these known patent specifications have the common drawback that they require a perforating needle. Consequently, it is necessary to ensure that this needle is not blocked up by the material which closes off the cartridge and that it retains its perforating power and does not become blunted with use. Moreover, if the needle is integral with the valve, and this is most generally the case, one and the same cartridge cannot be used in lighters of the same size but in which the mechanism is differently arranged, and this makes it necessary to provide as many different kinds of cartridges as there are lighters or equivalent apparatus. In the lighters described in U.S. patent specification No. 2,539,653, the same drawback is to be observed, although it is somewhat offset by the fact that the petrol does not have to flow directly in alignment with the wick of the burner. Nevertheless, the problem does exist to a certain extent because the cartridge has to be introduced at the top of the lighter and it is not possible to arrange the operating mechanism in an arbitrary way. In addition, a design of this kind would be difficult to adapt to a gas lighter since the volume of wadding which fills the reservoir proper, that is to say the major part of the lighter, considerably reduces the effective space in relation to what would be the case with a reservoir without any wadding, so that a cartridge full of petrol but having relatively small dimensions, would suffice to fill the reservoir whilst with a cartridge containing a liquefied gas such as butane, there would be no question of it only occupying a small part of the reservoir.

The lighter in accordance with U.S. patent specification No. 2,810,282, avoids certain of the drawbacks presented by other lighters, but exhibits other ones. First, as indicated above, two seals are required, one of which can virtually only be fitted by separating the reservoir case from the wall carrying the mechanism, and the other of which requires the production of a peripheral groove in the cartridge. Secondly, again as described hereinbefore, it is necessary to choose the device which seals the cartridge, and the needle as well, in an appropriate way in order to ensure that the gas is liberated freely. In addition, the device provided in order to apply the cartridge to the needle, is complicated. It comprises a pivoting ring with which the base of the cartridge engages, and an independent screwed base. Finally, since the reservoir case is located in an external ornamental cover, it is necessary to remove at least the base of the cover in order to gain access to the reservoir to fill the cartridge when the latter is empty. Thus, there are at least two bases to remove and replace.

It is an object of the present invention to overcome or minimise the drawbacks of the known devices.

According to the present invention a gas fuelled device comprises a casing carrying an expansion valve and adapted to have a cartridge containing liquid gas inserted in it, the casing affording a chamber arranged so that gas from the cartridge flows into it prior to reaching the expansion valve, and a detachable base on the casing, which, in the assembled position, is arranged to seal the chamber and to cause gas in the cartridge to flow automatically into the chamber.

Preferably, the base is formed of or includes a transparent material to enable a check to be made to determine whether or not there is any fuel in the casing.

Preferably also the casing is formed of a synthetic material and the chamber is cylindrical and has mounted in its end remote from the base the expansion valve, in engagement with an operating mechanism, the casing comprising at its bottom end a threaded counterbore into which the said base is adapted to be screwed.

In one embodiment of the invention, the said base is provided with a projection which is arranged when it is screwed in to the assembled position to open up a closure in the base of the cartridge.

Conveniently, the base has a peripheral groove adapted to receive an annular seal, and also has an upper portion with a peripheral protuberance which co-operates with the wall of the cylindrical chamber in order so as to provide a temporary seal prior to the complete screwing in of the base and the coming into operation of the seal.

The projection on the base is formed so as to leave between the projection and the opening of the cartridge a space through which the gas can flow into the chamber.

Preferably, the cartridge is sealed by a pin, plug or a deliberately weakened portion which the projection displaces inwards into the cartridge at the time that the base is screwed into the assembled position. If the cartridge is arranged to be reloaded, it may be provided with a spring-loaded sealing device of known kind, adapted to be opened by the projection and arranged to close again once the cartridge is empty and removed from the device and which is arranged to lift again under the pressure of gas to enable the cartridge to be refilled.

In another embodiment, the base of the cartridge is movable between a closed position in which the cartridge is sealed off, and an operating position in which the cartridge communicates with the chamber in the casing, the base of the cartridge being externally threaded at the periphery to enable it to be screwed into a corresponding thread in the casing, the latter not having a separate base from the cartridge so that the cartridge forms the base of the chamber.

In this case, a coil spring or strip spring may bias the base into sealing engagement with a shoulder on the cartridge in order to seal off same in the closed position, and the screwing of the base into the casing compresses the spring and opens the cartridge, the spring being compressed by the liquid gas and allowing the latter to penetrate into the cartridge to load same.

The liquid gas contained in the chamber may be supplied to the expansion valve across a porous disc placed at the end of the chamber remote from the base, through a wick disposed in the longitudinal groove in the location, or again through a line secured to each cartridge.

Figure 5:
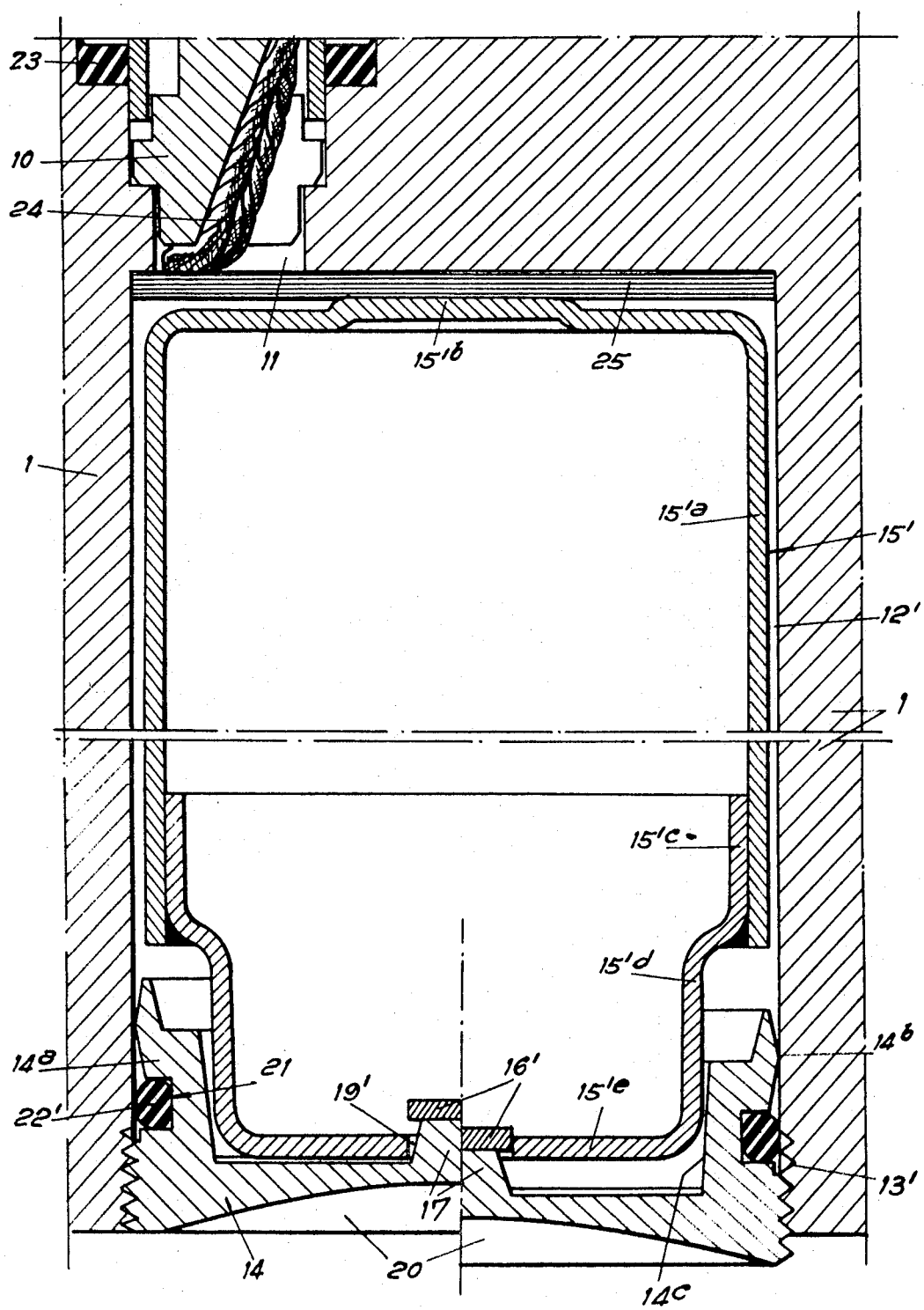
Figure 6:
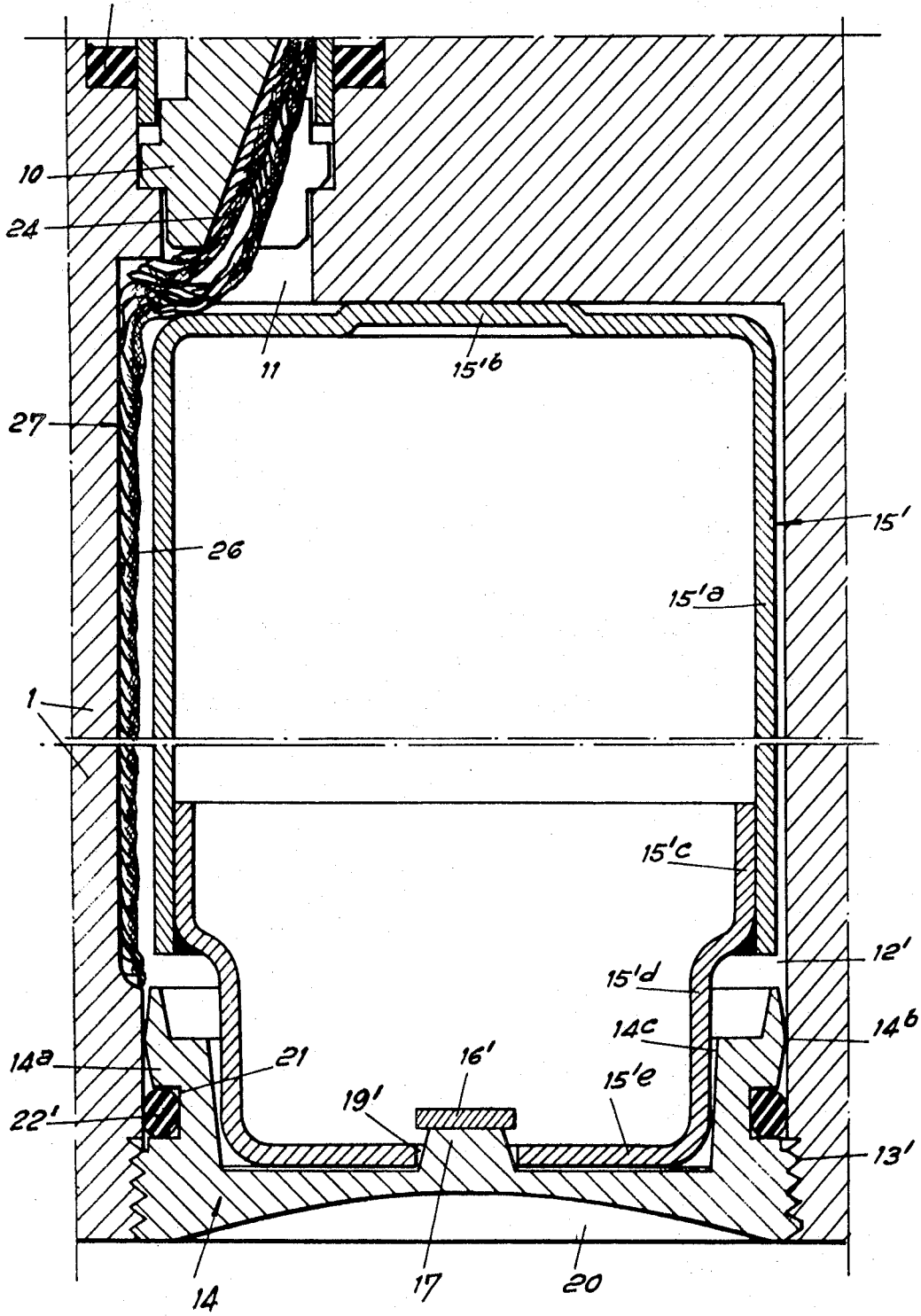
Figure 7:
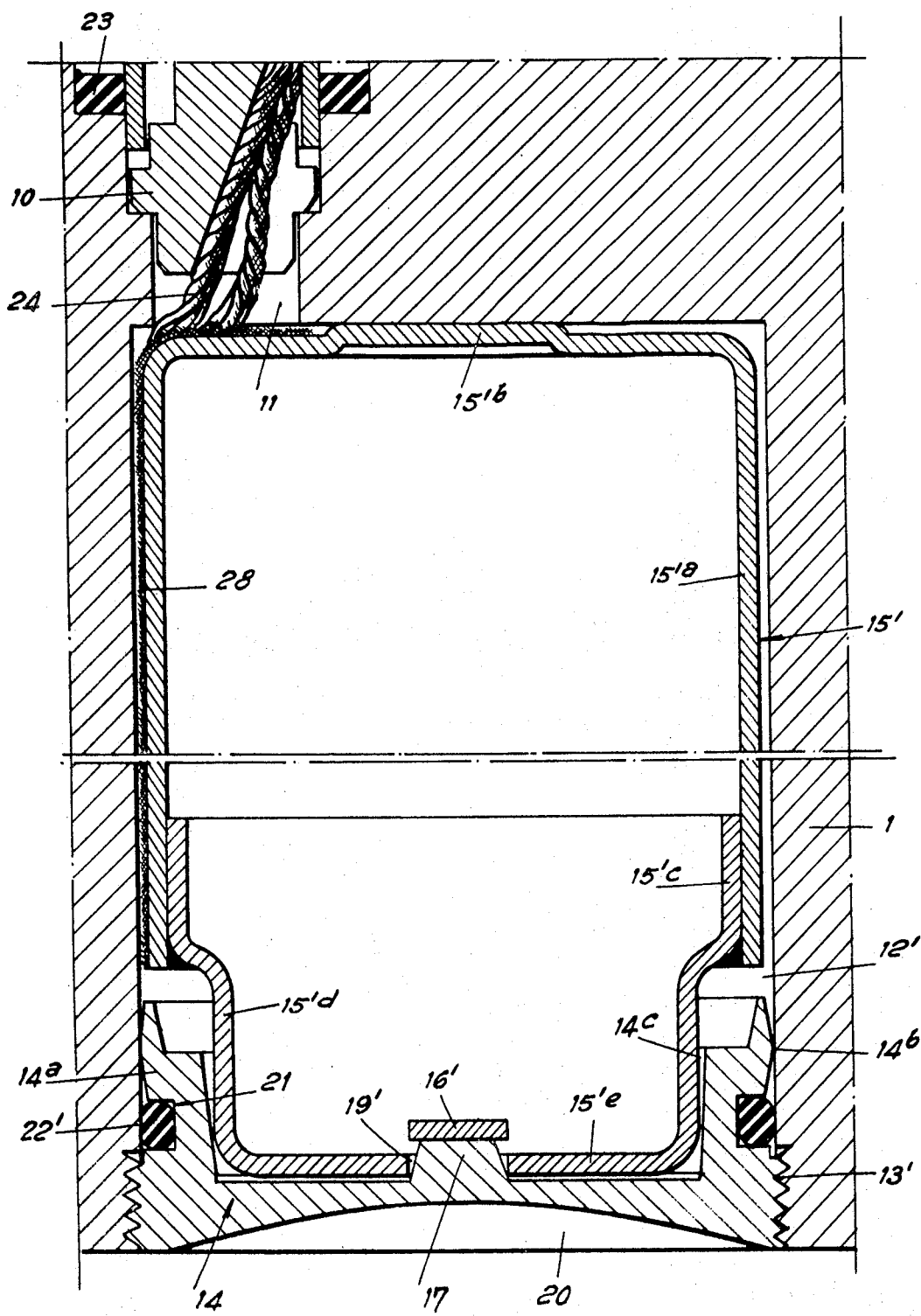
Figure 8:
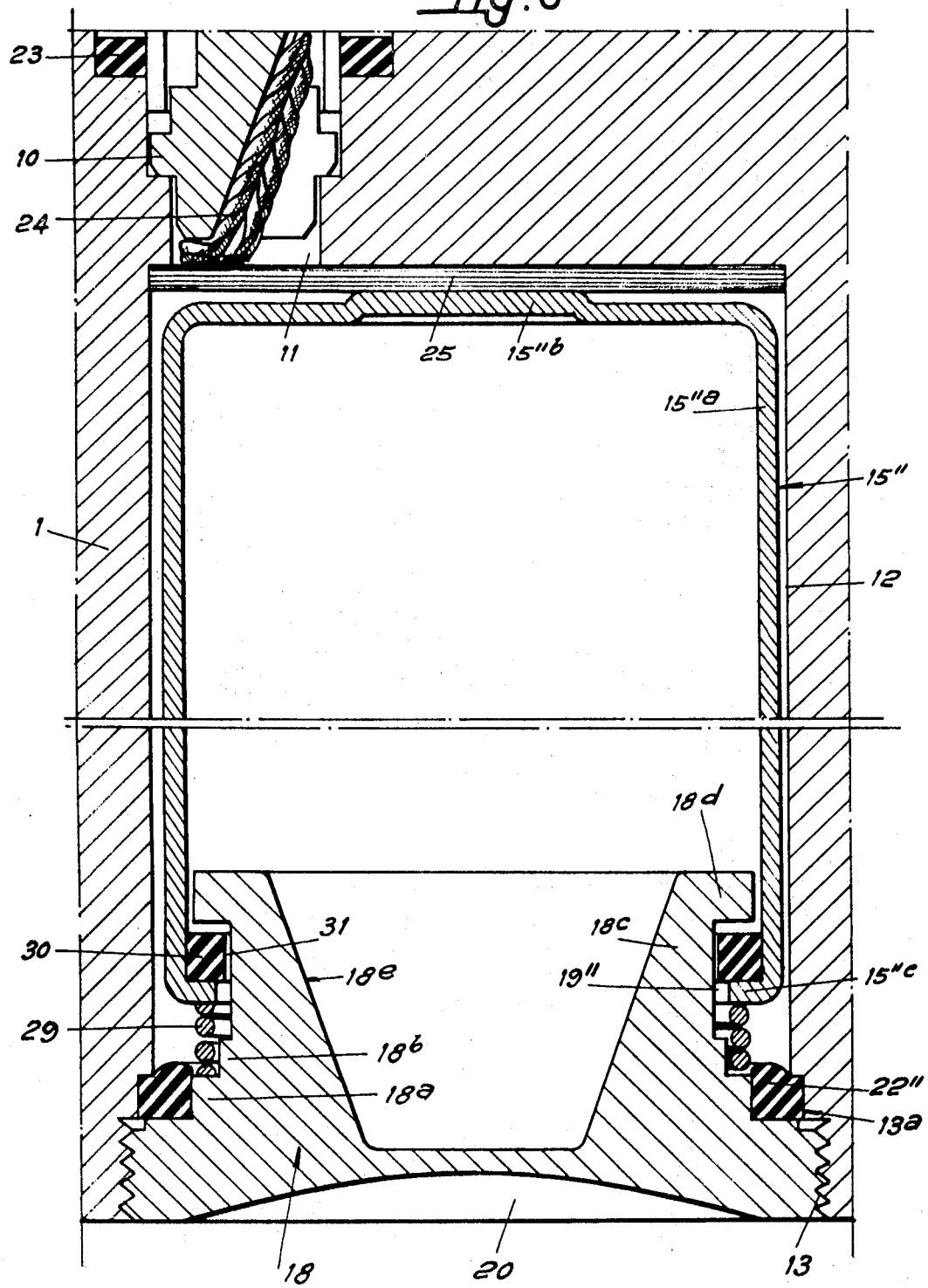
Figure 9:
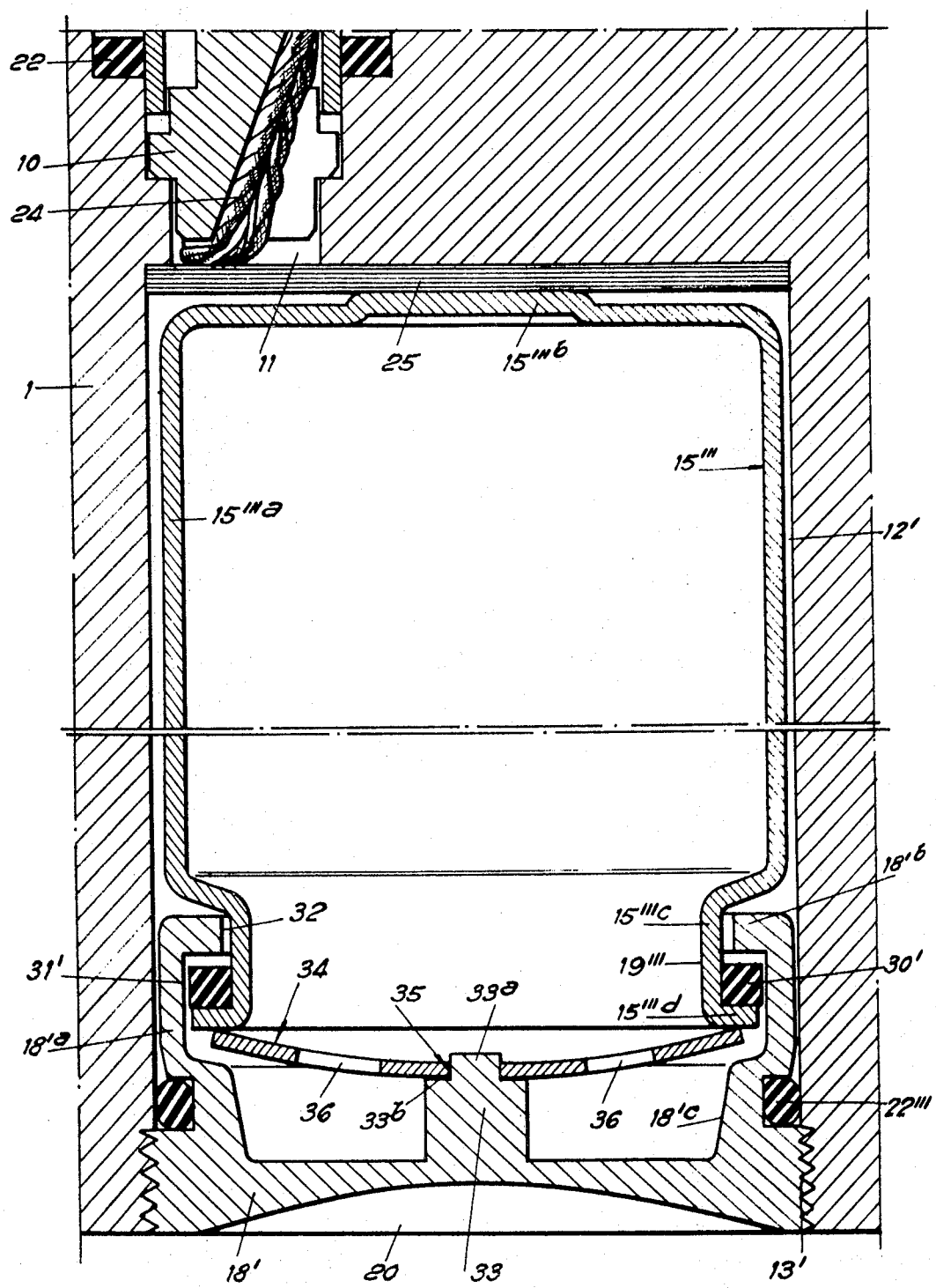

The invention may be carried into practice in various ways and various specific embodiments of the invention as applied to a gas fuelled lighter will now be described by way of example with reference to the accompanying drawings, in which:

FIG. 1 is an elevation, partially cut away, of one form of gas fuelled lighter according to the invention, FIG. 2 is an elevation taken at right-angles to that of FIG. 1, FIG. 3 is a plan view of the lighter, FIG. 4 is an enlarged section through the lower part of FIG. 1 showing the cylindrical chamber equipped with a porous washer in contact with the wick of the expansion valve, and a cartridge sealed off by a pin, the left hand half section showing the pin when it has been pushed through by the detachable base, and the right-hand half section showing the pin when it is about to be pushed through, FIG. 5 is a view similar to that of FIG. 4 but showing another embodiment in which the opening in the cartridge is sealed off by a weakened area, FIGS. 6 and 7 show sections similar to that of FIG. 5 but respectively illustrate a case equipped with a wick and a cartridge equipped with a flocked line, there being no porous washer in the cylindrical chamber, and FIGS. 8 and 9 are sections similar to those of FIGS. 6 and 7, through two other embodiments in which the base of the cartridge also forms the base of the case.

The lighter shown in the figures is of diamond-shape considered in section in a plane perpendicular to its height, as shown in FIG. 3. It may, however, be of any other form provided that the chamber forming the reservoir is cylindrical. This is why, in FIGS. 4 to 9, only that part of the case in the neighbourhood of the cylindrical location, has actually been shown, and not the exterior of the casing.

FIGS. 1 to 3 illustrate the invention applied to a lighter the body or casing of which is made of a synthetic material suitable for the fuel gas used and has in its upper part a lighter mechanism located in a detachable cover 2, the cover having a top opening 3 for the exit of the flame and an opening 4 in its lateral walls for the passage of a flintwheel driver 5, together with an opening 6 for the passage of a control lever 7, and an opening 8 for the passage of a regulating wheel 9. The lever 7 pivots in order to open an expansion value 10 (only the bottom part of which is visible in FIGS. 1 and 4 to 9). The driver 5 produces the sparks by rubbing a flintwheel against a flint in order to ignite the gas leaving the valve 10. The wheel 9 is provided in order to regulate the flame height as required. The assembly of the mechanism is well known and does not form part of the invention, and it should be clearly understood that the invention is applicable not only to cigarette lighters of any type, but also to arrangements other than lighters.

The valve 10 is located in an eccentrically pierced bore 11 in the casing 1 (FIGS. 4 to 9) which allows the upper part of the lighter, containing the lighter mechanism, to communicate with a cylindrical axially extending bore 12 (or 12′) which constitutes one of the features of the invention. The bore 12, 12′ is open at its bottom end and contains a threaded counterbore 13 (FIGS. 1, 4 and 8) or 13′ (FIGS. 5 to 7 and 9) into which a cap or base 14 (FIGS. 1 and 4 to 7) can be screwed to form a chamber, which term will be used hereafter for convenience to refer to the bore whether or not the base is added. A cartridge 15 (FIGS. 1 and 4), 15′ (FIGS. 6 and 7), 15″ (FIG. 8) or 15‴ (FIG. 9), containing liquid gas such as butane, can be placed in the bore 12. In the examples of FIGS. 1 to 7, this cartridge is closed off by an appropriate sealing device, illustrated in FIGS. 1 to 4 in the form of a pin 16 and in FIGS. 5 to 7 in the form of a weakened area 16′. The base or cap 14 is provided at its centre with a projection 17 which is designed, when the base is screwed in, to displace the pin 16 or the weakened area 16′. In the embodiments of FIGS. 8 and 9, the features of which will be described hereinafter, the casing does not have a separate base the base of the cartridge 18 or 18′, as the case may be, closing the cartridge and the casing 1.

The first embodiment of the lighter and the arrangement of the chamber and cartridge will now be described in greater detail with reference to FIGS. 4 to 7.

As shown in these figures the cartridge is made up from two stamped or drawn components soldered together, the top part 15a or 15′a, the top face of which has a spigot 15b or 15′b at its centre, acting as a spacer, and a bottom part 15c, 15d, or 15′c, 15′d. In the embodiment of FIG. 4 the base 15e of this bottom part is provided at its centre with an internal spigot 15f defining an opening 19 into which the pin 16 is force-fitted by some appropriate means, after the cartridge has been filled. In the embodiment of FIGS. 5 to 7, the base 15'e is provided at its centre with an opening 19' closed off by the weakened area 16'.

The cap or base 14 is made of a transparent plastics material in order to make it possible to determine whether or not there is any liquid gas present. It contains a screwdriver slot 20 for the introduction of a tool such as a coin, enabling it to be screwed into or out of the counterbore 13 or 13'. It has a more or less dished form and has a spigot portion 14a containing a peripheral groove 21 for a square-section ring seal 22 (FIG. 4) or a toroidal seal 22' (FIGS. 5 to 7), and, above the groove 21, has a peripheral projection 14b which, virtually as soon as the plug 14 starts to be screwed in, comes into contact with the wall 12 or 12' of the cylindrical location in order to provide a temporary seal until the seal 22 or 22' proper, comes into operation. Preferably, the internal wall 14c of the spigot 14a will be slightly frustoconical in form and will flare outwards and upwards in order to facilitate the introduction and centring of the extremity 15d or 15'd of the cartridge.

In addition, the valve 10 is assembled in a sealed manner at 23 (FIGS. 4 to 9) in the casing 1, the valve having a wick 24 which is flush with at least the bottom end of the bore 11. This wick carries the liquid gas to the expansion element proper. The valve 10 can be of any desired known type.

In order to supply to the wick the gas which is held in the chamber 12 or 12', a number of different arrangements may be provided. In the case of FIGS. 4, 5, 8 and 9 a porous washer 25 is placed against the inner end of the bore 12 or 12' in contact with the wick, and the boss 15b, 15'b, 15"b or 15"'b of the cartridge bears against said washer. In the case of FIGS. 6 and 7, the porous washer 25 is omitted. In FIG. 6, it is replaced by a wick 26 arranged in a longitudinal groove 27 in the chamber 12', and which extends the wick 24 or forms part of it. In the case of FIG. 7, the washer 25 is replaced by a flocked line 28 integral with the cartridge 15'. The design is thus arranged so that the wick 24 comes into contact with the line 28 at the time that the cartridge is fitted in position.

The operation of the lighter is as follows:

A cartridge 15 or 15' is inserted into the chamber 12 or 12' and up to the inner end thereof. The base 14 is then screwed in and the projection 17 comes into contact with the sealing device 16 or 16' and commences to displace it. Before the orifice 19 and 19' is opened and the seal 22 or 22' comes into engagement with the wall of the chamber 12 or 12', the projecting part 14b comes into engagement with the said wall and provides a temporary seal until the base 14 is fully screwed in. Thus, a double seal is effected, namely at 14b and 22 or 22'.

The spigot 14a has a small degree of elasticity in order to ensure good sealing, the external diameter of the said spigot 14a being slightly larger than that of the chamber 12 or 12'. When the sealing device 16 or 16' has been fully displaced into the interior of the cartridge, the gas flows through the orifice 19 or 19' around the projection 17 into the space defined between the cartridge 15 or 15' and the wall of the chamber 12 or 12', thus penetrating via the wick 26, the flocked line 28 or the porous washer 25, to the wick 24 of the valve 10. Then, it is merely necessary to operate the ignition mechanism (in the present instance, the lever 7 and the driver 5) in order to cause the gas to escape and ignite.

It will be noted that in the case of FIG. 4, the cylindrical chamber contains a double counterbore, the upper portion 13a of which has a diameter substantially equal to the external diameter of the seal 22, in order that the latter shall provide a seal not only along a longitudinal wall of the bore but also along a diametral shoulder. This feature is not essential but simply advantageous.

In the embodiments of FIGS. 8 and 9 the general arrangement of the cylindrical chamber and the valve is the same as that described above and no further description in this direction will be given here, and also in these figures the wick 24 is in contact with the porous washer 25 as in the case of FIGS. 4 and 5.

In the embodiment of FIGS. 8 and 9, the cartridge 15" (FIG. 8) or 15"' (FIG. 9), has no fixed base but itself and this part of the arrangement is constituted by a component, partially externally threaded, which serves both as the base of the cartridge and as the base of the casing, i.e. it acts as the cap and projection. In the arrangement of FIG. 8, the cartridge 15" is cylindrical and, like the cartridges 15 and 15', has a boss 15"b at its top, and a cylindrical side wall 15"a. Its bottom part has an internal spigot 15"c which defines a circular central opening 19". The component 18 acts as a closure for the base of the casing 1 and for the cartridge 15". It is provided at the bottom part of the periphery with an external thread which co-operate with the thread 13 on the casing 1, and this part is then followed by successive smooth cylindrical portions 18a to 18c of which progressively reduce in order to respectively take an annular seal 22', a spring 29 and an annular seal 30, the section 18c penetrating into the opening 19" with a certain clearance and the seal 30 bearing against the flange 15" of the cylindrical wall 15"a and leaving between itself and the section 18c an annular space 31. Finally, the component 18 terminates inside the cartridge 15" in a flange 18d whose diameter is slightly smaller than the internal diameter of the cylindrical wall 15"a and virtually the same as that of the section 18a. The interior of the component 18 is recessed at 18e on the cartridge side. The bottom face of the component 18, like the base 14, has a screwdriver slot 20.

The operation is as follows:

Before the cartridge is applied to a lighter, the spring 29 forces the seal 30 against the flange 18d, seating for this purpose against the shoulder formed by the junction between the sections 18a and 18b. The cartridge 15" is thus sealed. If the base 15", 18 is placed in an enclosure containing liquid gas under pressure the pressure tends to lift the flange 18d away from the seal 30 since the gas tends to penetrate into the annular space 31 (it is assumed, of course, that the component 18 is maintained fixed). The cartridge is thus filled. When it is full, the pressure balances and the spring 29 closes the cartridge again. The gas pressure in the cartridge then keeps same sealed. When the assembly of cartridge 15" and cap 18 is screwed into the thread 13, the seal 22" providing the seal between the casing 1 and the component 18, the cartridge comes up against the washer 25 with its boss 15"b (or against the end of the chamber 12 if the arrangements of FIGS. 6 and 7 are being used), and the screwing-in of the component 18 lifts the flange 18d away from the seal 30. The liquid gas contained in the cartridge can then escape through the space 31 and the opening 19" and flow into the annular space defined between the wall 15"a and the wall 12.

In the design of FIG. 9, the cartridge 15"' has a cylindrical portion 15"'c of reduced diameter and an external flange 15"'d which defines an opening 19"'. The component or base 18', which resembles the base 14 and the like the latter comprises a central boss, has an external threaded portion which co-operates with a thread 13' in the casing 1, and also has a peripheral groove for an annular seal 22"'. However, the component 18' also comprises a smooth cylindrical section 18'a terminating at its top end in an internally directed flange 18'b defining an opening 32 of larger diameter than the external diameter of the section 15"'c of the cartridge. A sealing ring 30' tightly surrounds the section 15"'c of the cartridge but leaves between itself and the wall 18' a small clearance. In addition, the central boss of the component 18' comprises two cylindrical sections 33, 33a of different diameters, defining between them a shoulder 33b. An elastic washer 34, containing a central opening 35 and also openings 36, is supported on the shoulder 33b. The washer 34 is downwardly convex, that is to say towards the exterior of the cartridge and bears at its periphery against the flange 15'''d. Normally, it biasses the seal 30' into contact with the flange 18'b and therefore seals off the cartridge.

The operation of the system is very similar to that of the design of FIG. 8. Before it is applied to a lighter, the component 18' closes the cartridge. The cartridge is filled in the same manner as the construction shown in FIG. 8 by distorting the washer 34 so that the gas flows through the opening 32 and the space 31. When the assembly comprising the cartridge 15''' and cap 18' is screwed into the thread 13', the washer 34 is distorted and the gas can flow through the space 31' and the opening 32 in order to penetrate between the walls 15''' a and 12', the holes 36 enable the gas to flow into the space 31' through the hollow interior 18'c of the component 18'.

In the embodiment of FIG. 8, the seal 22''a will preferably have the form shown and the cylindrical location will contain a counterbore 13a, whilst in the design of FIG. 9, the seal 22''' is substantially toroidal and the wall 12' smooth at this point.

It is obvious that in practice the fitting of the seal 22 or 22' (FIGS. 4 to 7) does not provide any problem, since it is merely necessary to thread it elastically around the portion 14b. The same applies to the seals 22' and 22'''. The seal 30 is fitted after the flange 18d has been entered into the cartridge 15'', and prior to the formation of the flange 15''c. The seal 30' is fitted prior to the formation of a flange 15'''d and the flange 18'b is formed after the fittting of the washer 34.

With the embodiments of FIGS. 8 and 9 it is possible to avoid the kind of accident which may occur in the arrangements of FIGS. 4 to 7, if the user were to inadvertently unscrew the base before the reservoir was completely empty. In other words, as described above, the spring 29 or 34 automatically closes off the cartridge as soon as the component 18 or 18' ceases to be supported by the casing 1. In addition, all these embodiments are applicable not merely to lighter devices, that is to say to the case where the cartridge contains a fuel gas and the case is fitted with an ignition mechanism associated with the expansion valve 10, but may equally well be applied to aerosol bombs or the like, the body of which is a permanent item and can therefore be made of a relatively expensive material and be given an external shape and decoration of any desired kind.

The embodiments described and illustrated may be modified as required. In particular, as indicated hereinbefore, any kind of combination of cartridge openings and projection and base can be employed to open the cartridge once it has been fitted in position in the chamber of the body of the apparatus. Also, the invention is equally applicable to lamps, a cartridge of appropriate dimensions being used and an appropriate expansion system for the liquid gas, the ignition of the gas being effected automatically or otherwise, either in the form of a direct flame or using a mantle of conventional kind. This application may be relevant in distress lighting, the gas-tightness of the valve being easily made of such quality that the cartridge does not empty if the lamp is not used. A lamp of this kind could, in certain instances, advantageously replace an electric lamp the battery of which discharges rapidly even if the lamp is only used infrequently. Again, there is nothing to prevent the same principle of cartridge and cylindrical location, from being employed to supply a portable stove, or, as indiciated earlier before, an aerosol bomb or the like.

What I claim as my invention and desire to secure by Letters Patent of the United States is:

1. A gas fueled device comprising a casing having an expansion valve mounted therein, said casing having a cartridge containing liquid gas inserted therein and having a chamber providing a flow path for gas from said expansion valve, said cartridge having an outlet opening therein and detachable closure means for sealing said opening, a detachable base member operably engaged with said casing to seal said casing in the assembled position and having projection means thereon with a surface for abutting said closure means and for moving the entire closure means with respect to said opening into said cartridge, said projection means having a smaller cross-sectional area than said opening to provide a space therebetween whereby said gas from said cartridge flows through said space to said chamber when said closure means is moved away from said opening by said projection in said assembled position.

2. A device as in claim 1 in which the base is formed from transparent material to enable a check to be made to determine whether there is any fuel in the casing.

3. A device as claimed in claim 1 in which the casing is formed of a synthetic material and the chamber is cylindrical and has mounted in its end remote from the base the expansion valve in engagement with an operating mechanism, while the casing comprises at its bottom end a threaded counterbore into which the said base is adapted to be screwed.

4. A device as claimed in claim 3 in which the base has a peripheral groove adapted to contain a sealing ring, and has an upper portion provided with a peripheral protuberance which co-operates with the wall of the cylindrical chamber so as to provide a temporary seal prior to the complete screwing into the assembled position of the base and the coming into operation of the said seal.

5. A device as claimed in claim 1 in which the liquid gas contained in the chamber is supplied to the expansion valve through a porous disk placed in the end of the chamber remote from the base.

6. A device as in claim 3 wherein said closure means comprises a plug member force fit in said opening, said plug being removed and displaced from said opening by said projection as said base is screwed into the assembled position.

7. A device as in claim 3 wherein said closure means comprises a weakened wall portion of said container, said wall portion being removed and displaced from said opening by said projection when said base is screwed into the assembled position.

8. A device as defined in claim 1 in which the liquid gas contained in the chamber is supplied to the expansion valve through a wick disposed in a longitudinal reservoir in the chamber.

9. A device as defined in claim 1 in which the liquid gas contained in the chamber is supplied to the expansion valve through a flocked line on the cartridge.

References Cited

UNITED STATES PATENTS

| | | | |
|---|---|---|---|
| 2,659,629 | 11/1953 | Graham | 141—19 |
| 2,727,376 | 12/1955 | Felt | 431—142 X |
| 3,084,833 | 4/1963 | Kline et al. | 222—5 X |
| 3,154,935 | 11/1964 | Ayres | 62—50 X |
| 3,270,528 | 9/1966 | Gevirman et al. | 431—142 |

CARROLL B. DORITY, JR., Primary Examiner

U.S. Cl. X.R.

141—19; 222—5; 431—142

UNITED STATES PATENT OFFICE
CERTIFICATE OF CORRECTION

Patent No. 3,620,015　　　　　　　　　　Dated Nov. 16, 1971

Inventor(s) Robert R. Hocq

It is certified that error appears in the above-identified patent and that said Letters Patent are hereby corrected as shown below:

Claim 1, line 5 - before "expansion" insert -- cartridge
to said --

Signed and sealed this 20th day of June 1972.

(SEAL)
Attest:

EDWARD M. FLETCHER, JR.　　　　ROBERT GOTTSCHALK
Attesting Officer　　　　　　　　Commissioner of Patents